US008213411B2

(12) United States Patent
Ayers et al.

(10) Patent No.: US 8,213,411 B2
(45) Date of Patent: Jul. 3, 2012

(54) CHARGING DATABASE WITH CLASS OF SERVICE (COS)

(75) Inventors: John I. Ayers, Omaha, NE (US); Anders H. Askerup, Omaha, NE (US); Bradley T. Kenyon, Omaha, NE (US); Srinivas Chilukuri, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2056 days.

(21) Appl. No.: 11/212,246

(22) Filed: Aug. 26, 2005

(65) Prior Publication Data
US 2007/0046253 A1 Mar. 1, 2007

(51) Int. Cl.
*H04L 12/66* (2006.01)

(52) U.S. Cl. ..... 370/352; 370/356; 370/389; 370/395.5; 370/395.52; 370/401; 370/432; 370/493; 455/405; 455/406; 455/408; 455/414.1; 379/114.01; 379/132; 725/1; 725/2; 725/8

(58) Field of Classification Search .......... None
See application file for complete search history.

(56) References Cited

U.S. PATENT DOCUMENTS

| 6,047,051 | A * | 4/2000 | Ginzboorg et al. | 379/130 |
|---|---|---|---|---|
| 7,567,796 | B2 * | 7/2009 | Tammi et al. | 455/411 |
| 7,613,705 | B2 | 11/2009 | Ayers et al. | |
| 7,680,481 | B2 * | 3/2010 | Ejzak et al. | 455/406 |
| 7,787,858 | B2 * | 8/2010 | Koskinen et al. | 455/405 |
| 2003/0163545 | A1 | 8/2003 | Koshekelainen et al. | |
| 2004/0158618 | A1 | 8/2004 | Shaw | |
| 2004/0186901 | A1 | 9/2004 | Guigui | |
| 2004/0193700 | A1 | 9/2004 | Westman et al. | |
| 2004/0234060 | A1 | 11/2004 | Tammi et al. | |
| 2005/0136926 | A1 | 6/2005 | Tammi et al. | |
| 2005/0190772 | A1 * | 9/2005 | Tsai et al. | 370/395.52 |
| 2005/0278420 | A1 | 12/2005 | Hartikainen et al. | |
| 2006/0035637 | A1 | 2/2006 | Westman | |
| 2006/0140385 | A1 | 6/2006 | Haase et al. | |
| 2006/0212511 | A1 * | 9/2006 | Garcia-Martin | 709/203 |
| 2006/0225128 | A1 | 10/2006 | Aittola et al. | |
| 2007/0002779 | A1 | 1/2007 | Lee et al. | |
| 2007/0046253 | A1 | 3/2007 | Ayers | |
| 2007/0047558 | A1 | 3/2007 | Ayers et al. | |
| 2007/0209061 | A1 | 9/2007 | Dekeyzer et al. | |

FOREIGN PATENT DOCUMENTS

| WO | WO2004036825 | * | 4/2004 |
| WO | WO 2004/088950 | | 10/2004 |
| WO | WO 2004/089023 | | 10/2004 |

OTHER PUBLICATIONS

3GPP TS 29.228 V6.5.0, Dec. 23, 2004.*
Wikipedia, The Free Encyclopedia, IP Multimedia Subsystem, http://en.wikipedia.org, pp. 1-8, prior to Aug. 2005.

(Continued)

*Primary Examiner* — Faruk Hamza
*Assistant Examiner* — Aixa A Guadalupe

(57) ABSTRACT

Systems, methodologies, media, and other embodiments associated with provisioning an internet protocol (IP) multimedia core network subsystem (IMS) are described. One exemplary system embodiment includes logic for provisioning an IMS charging database with charging data and logic for provisioning an IMS user database with user data. The exemplary system embodiment may also include logic for provisioning an IMS call session control function (CSCF) logic with data that relates a user to charging information based, at least in part, on a charging class of service (COS) identifier.

31 Claims, 10 Drawing Sheets

OTHER PUBLICATIONS

European Patent Office; Patent Search Report & Written Opinion of Int'l. Searching Authority for Appl. PCT/US2006/027874; dated Dec. 8, 2006.
Sophia-Antipo; Digital Cellular Telecom. System (Phase 2+) ETSI Standards; Jun. 2005; pp. 7-8, 13-15; vol. 3-CN4, No. V5100; European Telecom. Standards Institute; France.
International Search Report; dated Dec. 12, 2006.
Written Opinion of the International Searching Authority or the Declaration; dated Dec. 12, 2006.
International Preliminary Report on Patentability ; Dated Aug. 26, 2005.
Hoffer et al: Logical Database Design and the Relational Model; Library of Congress Cataloging-in-Publication Data; Modern Database Management seventh edition; pp. 1987-226.
Response to European Search report; dated Jan. 11, 2010.
Office action dated Sep. 16, 2009 from U.S. Appl. No. 11/213,363.
Office action dated Apr. 1, 2010 from U.S. Appl. No. 11/213,363.
Final Office action dated Aug. 20, 2009 from U.S. Appl. No. 11/213,357.
Office action dated Mar. 5, 2009 from U.S. Appl. No. 11/213,357.
Office action dated Sep. 18, 2008 from U.S. Appl. No. 11/213,357.
Office action dated Apr. 4, 2008 from U.S. Appl. No. 11/213,357.

* cited by examiner

CHARGING DATABASE WITH CLASS OF SERVICE (COS)

CROSS-REFERENCE TO RELATED APPLICATIONS

This application is related to the following U.S. patent applications, which are all assigned to the present assignee:

"Application Server (AS) Database With Class Of Service (COS)", Ser. No. 11/213,357 filed Aug. 26, 2005, inventors: Ayers et al., "Automated Application Server (AS) Permissions Provisioning", Ser. No. 11/213,363 filed Aug. 26, 2005, inventors: Ayers et al., "Initial Filter Criteria (IFC) Database with Class of Service (COS)", Ser. No. 11/213,361 filed Aug. 26, 2005, inventors: Ayers et al.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Telephones no longer just transmit and receive telephone calls. Devices including cellular telephones, PDAs, laptop computers, and so on, collectively referred to as user equipment (UE), may transmit and receive telephone calls, may transmit and receive text messages, may participate in video-conferencing, may participate in multi-player gaming, may share content, and so on. These types of activities may be referred to collectively as multimedia services. In some cases these multimedia services may be provided over the Internet using the Internet Protocol (IP).

An IP Multimedia Core Network Subsystem (IMS) includes core network (CN) elements for providing IP multimedia services. These IP multimedia services may include telephony (e.g., Voice over IP (VoIP)), push to talk over cellular (PoC), text messaging, and so on. Within various services, other sub-services may be provided. For example, in the telephony service, sub-services including call forwarding, call waiting, voice mail, multi-party calling, and so on, may be provided. Conventionally, each of these services and/or sub-services may have been provided by a stand-alone electronic system, computer, and/or computer system. Various IMS switches may be configured with information, for example, on a per-session basis to facilitate connecting users to services and to facilitate charging users for services.

IMS defines how requests for service are routed to an Application Server (AS) that can provide the service. IMS also may also define which protocols are supported in a communication network, how a user is charged, and so on. A user may access services via a dynamically associated, service-independent, standardized access point referred to as a call session control function (CSCF). A CSCF may be allocated dynamically to a user at log-on or when a request addressed to the user is received. Since an IMS may include multiple CSCFs, a decision may be made on which CSCF to allocate to a user. This decision may be made, at least in part, by comparing server capabilities available in a CSCF to server capabilities required and/or desired by a user. To facilitate interacting with a user, a CSCF may acquire data that is more permanently stored in a Home Subscriber Server (HSS) (e.g., user data, charging information). Once authenticated through an IMS service, the user may access other IMS services for which the user is authorized. Authentication may be handled by the CSCF as the user signs on.

Services are not provided in a vacuum. For example, user demand may provide a rationale for providing services. Thus, not all services are provided free of charge. Organizations with an IMS based communication network may store data concerning their network. These organizations may store data not only about their network (e.g., configuration) but also about the users (e.g., subscribers) who use the network, devices (e.g., CSCF) that participate in providing services, charging information, billing information, and so on. Conventionally, IMS networks may have used a large database that stored a record for each subscriber. The database may have stored information including public and private user identities, services subscribed to, charges incurred, a subscriber's home network, a service provided by an AS, a CSCF available to handle communications, CSCF capabilities, and so on.

Since a CSCF may participate in communications, since communications may be billed for, and since a user may communicate, information about a CSCF or charging may have been stored in subscriber records. However, this may create provisioning, updating, maintenance, and other issues for database systems administrators and network administrators. By way of illustration, consider a business that manages a network having one million subscribers that use different services. Further consider that 100,000 of these subscribers are using the network at any given time. In this situation 100,000 users may be using a set of CSCFs having different capabilities and may be taking actions that incur charges. If information concerning a CSCF capability changes, then the system administrator may need to locate relevant CSCFs and update each of them. Similarly, if charging information (e.g., charging function, collection function) changes, then the system administrator may need to locate records associated with all the affected users and then change each of these records.

Additionally, adding and/or defining a user may create issues. For example, every user that is added or defined in the database may force the administrator to have to re-provision and define CSCF and/or billing information for the user. This creates many opportunities for errors as each record is individually provisioned with CSCF and/or billing data.

However, the issues do not stop with database record maintenance. As described above, messages may be handled by a CSCF. Handling the message may include acquiring user information and distributing it to various switches in a communication network. For example, a logical CSCF, which may include several physical components, may acquire user information including capabilities information and charging information. Now if the charging information changes, not only does each user record having the charging information have to change, but so too does each CSCF component having the charging information. In a large network this switch updating may be burdensome.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
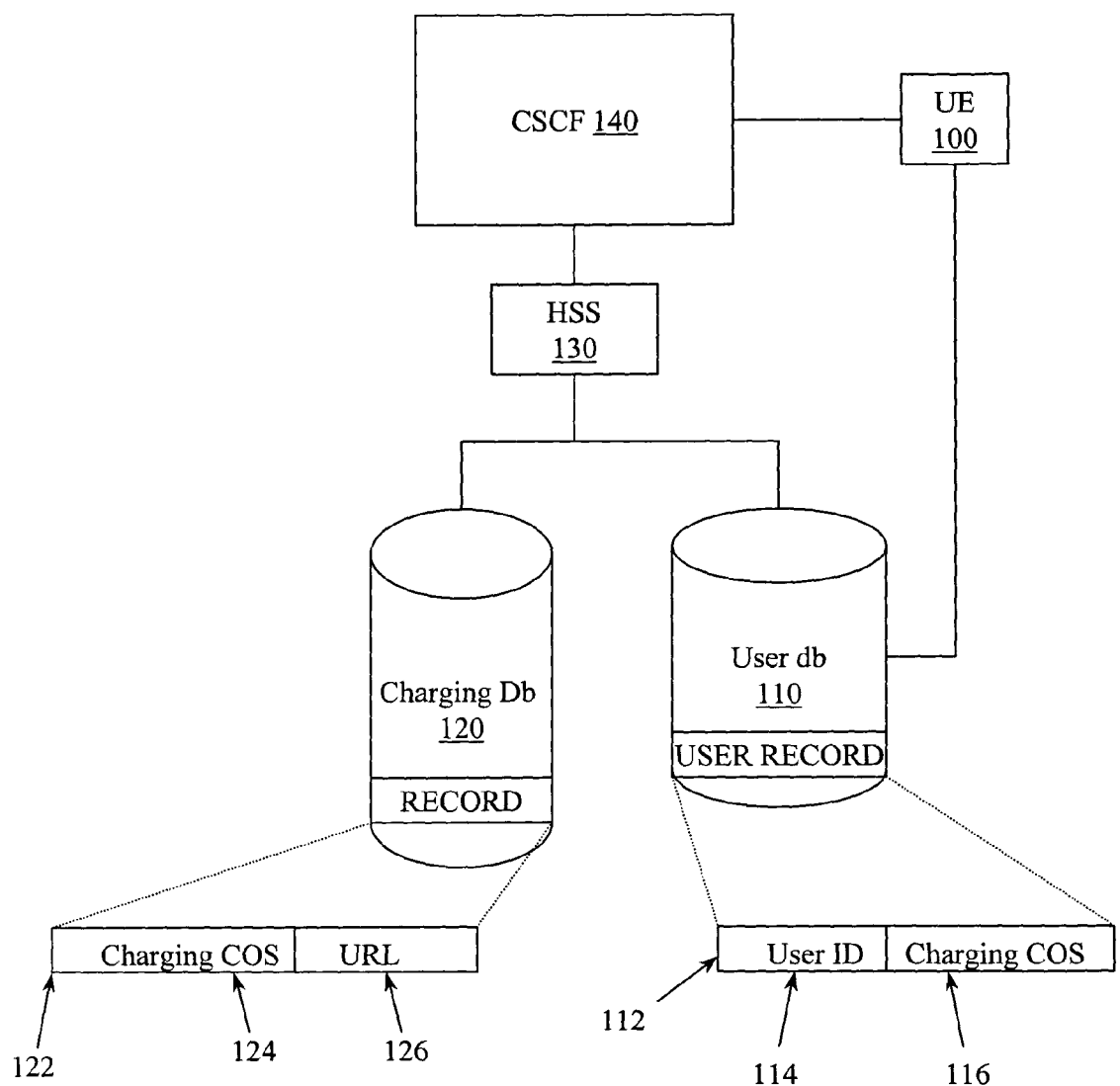
FIG. 1 illustrates portions of an example IMS.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks and so on. Volatile media may include, for example, semiconductor memories, dynamic memory and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, on the environment in which it runs, and/or on the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein may be developed using programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, automatically performing an action, or the like, refer to actions and processes of a computer system, logic, processor, or similar electronic device that manipulates and transforms data represented as physical (electronic) quantities.

FIG. 1 illustrates portions of an example IMS. The IMS may facilitate providing services to users equipped with UE (e.g., UE 100). UE may include, for example, cellular telephones, personal digital assistants (PDAs), and so on. A UE may be associated with a user described in various data stores in the IMS. The user may subscribe to various services that may require various capabilities in switches in the IMS. Thus, the IMS may include a user database 110 that is configured to store user information concerning an IMS user. The user information may be stored in a user record 112 in user database 110. A user record 112 may include, for example, a user identifier 114, a charging class of service (COS) identifier 116, and links to records that store information concerning UE/IMS interaction.

Rather than having user record 112 carry charging information directly, user record 112 may use charging COS identifier 116 to link to a charging database record 122 stored in a charging database 120. Charging database record 122 may include a charging COS 124 that is used as a primary key. Charging record 122 may also include data like a charging function address (e.g., URL 126). Decoupling charging information from user data in this manner facilitates mitigating database maintenance and switching issues described above. For example, if charging information changes (e.g., charging function name, charging function address, collection function name, collection function address), then updates can be made in charging database 120 rather than in each user record affected by the change.

The IMS may include an HSS logic 130 that is configured to facilitate provisioning a CSCF logic 140. CSCF logic 140 may interact with HSS logic 130 to become provisioned to facilitate interactions between UE 100 and the IMS. Part of the provisioning may include retrieving a user record concerning the user from user database 110. Part of the provisioning may also include retrieving capabilities data, as will be described in connection with FIG. 2.

While a single CSCF logic 140 is illustrated, it is to be appreciated that a CSCF logic may perform various roles and/or may be distributed between various logics. For example, a CSCF may perform a P-CSCF (proxy) role, an I-CSCF (interrogator) role, and/or an S-CSCF (serving) role. The proxy may be a first point of contact for a message, may be involved in authenticating a user, and may facilitate generating charging information, among other things. The interrogator may be an entry point to a domain for Session Internet Protocol (SIP) packets, may query an HSS to retrieve user location information to determine which S-CSCF, if any, to allocate to a user, and so on. The S-CSCF may perform session control and thus may perform, for example, SIP registration. In some examples, the S-CSCF may communicate with an HSS using the Cx protocol. In general it is the I-CSCF that determines which S-CSCF will be associated with a user for a session. The determination may be made, for example, based on capabilities a user session will require and capabilities an S-CSCF can provide. An example Cx protocol is described in 3GPP TS 29.228 V5.12.0 (2005-06) and 3GPP TS 29.229 V5.10.0 (2005-03).

To direct a message to an AS, CSCF logic 140 may be tasked with determining the actual address (e.g., uniform resource locator (URL)) of the AS. The application provided by the AS and/or UE 100 may have characteristics that make it desirable and/or necessary for CSCF logic 140 to have certain capabilities. Thus, as part of a process run, for example, when UE 100 begins interacting with the IMS, messages may be transmitted to and/or from an I-CSCF to HSS logic 130 to facilitate selecting an S-CSCF to allocate to a user. Part of the information exchanged in these messages can be user profile information stored in user database 110. Thus, part of the information exchanged can be charging information stored in charging database 120 and linked to user record 112. The specific charging information (e.g., charging function name, charging function address) can reside in the charging database 120 and can be retrieved using the charging COS identifier 116 in user record 112. Thus using the charging COS decouples not only user database 110 and user records (e.g., 112) from specific charging information but may also decouple CSCF logic 140 at least temporarily from charging information. This may facilitate, among other things, mitigating systems administration, database management, and IMS switch maintenance issues identified above.

A billing function may be employed to bill a user. Rather than store the billing function address (e.g., URL) in a user record, the billing function address may be stored in charging database 120. Similarly, rather than storing the billing function name in a user record, the billing function name may be stored in charging database 120. Ultimately, CSCF logic 140 may determine to charge a user. Thus, providing HSS logic 130 with charging COS 116 facilitates providing CSCF logic 140 with billing information like a function name and/or address from a charging record 122 in charging database 120.

Billing information may be dynamic. For example, a billing function name and/or address may change. Thus, after CSCF logic 140 resolves a billing function name and/or address, the name and/or address may change. Therefore, HSS logic 130 may employ a message like a Push Profile Request (see FIG. 8) to update CSCF logic 140 with the changed information. Compare this more precise method to the conventional approach of having to update every user record with changed billing information and having to update every CSCF in an IMS with changed information.

While charging database 120 and user database 110 are illustrated as separate components, in one example, charging database 120 and user database 110 may be organized together in an HSS database. Additionally, CSCF logic 140 may be configured to communicate with the HSS database using a Cx protocol. Thus, messages like those described in connection with FIG. 8 may be passed between CSCF logic 140 and HSS logic 130.

FIG. 1 illustrates a system that includes a charging database (CDB) 120 that is configured to store charging information concerning an IMS user. The charging information may be stored in a charging record 122 in CDB 120. In one example, a charging record 122 may include a charging COS identifier 124 that is used as a primary key. In different examples, a charging record may include a charging COS identifier, a primary event charging function address, a primary charging collection function address, a secondary event charging function address, a secondary charging collection function address, and so on. The charging database 120 may be laid out according to the schema described in FIG. 9.

The system may also include a user database 110 that is configured to store user information concerning an IMS user. The user information may be stored in a user record 112 in the user database 110. In one example the user record 112 may include a charging COS entry 116 that facilitates linking the user record 112 to the charging record 122.

The system may be arranged so that the CDB 120 and the user database 110 can be operably connected to a CSCF logic 140 via an HSS logic 130. The CSCF logic 140 may be configured to retrieve user record 112 from the user database 110 and to retrieve charging information from the CDB 120 using the charging COS identifier 116 in the user record 112. The charging COS identifier 116 may be used, for example, to select charging record 122 from the charging database 120. CSCF logic 140 may also be configured for charging the user based, at least in part, on the charging information retrieved from the CDB 120.

As described above, information like user data and charging data may be dynamic. Thus, in one example HSS logic 130 may be configured to update CSCF logic 140 upon determining that charging information concerning the user has changed in the CDB. HSS logic 130 may be configured to update CSCF logic 140 using a Push Profile Request (PPR) message defined in a Cx protocol.

While the user database 110 and the charging database 120 are illustrated as separate components, it is to be appreciated that CDB 120 and user database 110 may be organized in an HSS database. In the example, CSCF logic 140 may be configured to communicate with the HSS database using a Cx protocol.

Figure 2:
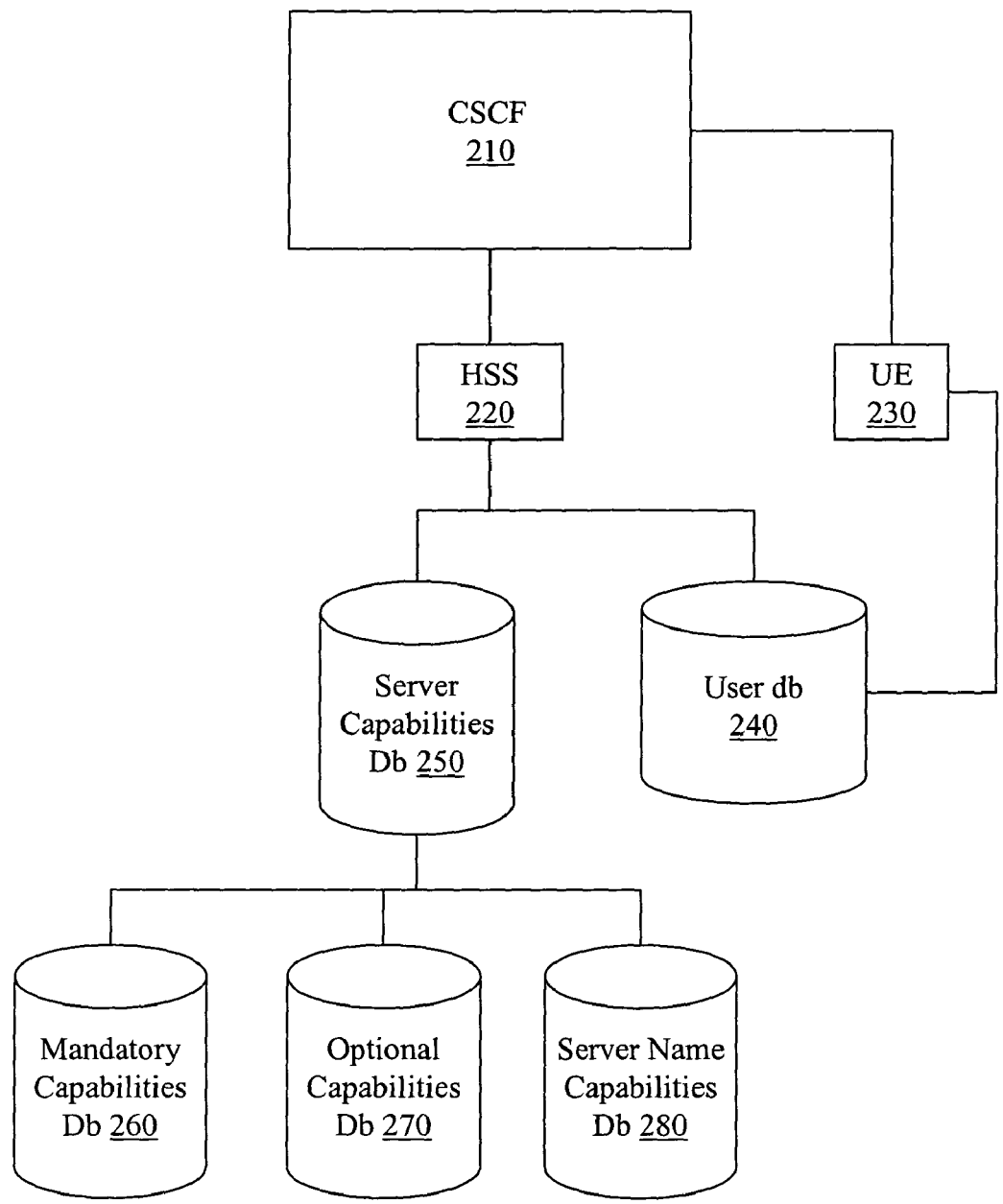
FIG. 2 illustrates portions of an example IMS.

FIG. 2 illustrates portions of an example IMS. The IMS may provide infrastructure for UE 230 to access services, to engage in communications, and so on. The IMS includes components similar to those described in connection with FIG. 1. For example, the IMS includes a CSCF logic 210, an HSS logic 220, and a user database 240 that may be configured to store user information concerning an IMS user. The user information may be stored in a user record in the user database 240. The user record may include a server capability set COS entry that facilitates linking a user record to a capability record and thus facilitates removing capability data from a user record.

Once again, while a single CSCF logic 210 is illustrated, it is to be appreciated that a CSCF logic may perform various roles and/or may be distributed between various logics. For example, a CSCF may perform a P-CSCF (proxy) role, an I-CSCF (interrogator) role, and/or an S-CSCF (serving) role.

The interrogator may determine which S-CSCF will be associated with a user for a session. The determination may be made, for example, based on capabilities a user session will require and capabilities an S-CSCF can provide. The determination may be based on information exchanged between the I-CSCF and the HSS using, for example, Cx protocol messages. An example Cx protocol is described in 3GPP TS 29.228 V5.12.0 (2005-06) and 3GPP TS 29.229 V5.10.0 (2005-03).

The system may also include a server capabilities database (SCDB) 250 that is configured to store server capabilities information (SCI) relating a user and an S-CSCF. The SCI may be stored in a server capabilities record in SCDB 250. SCDB 250 may store server capabilities records that include a server capability COS identifier that may function as a primary key.

SCDB 250 may be configured to facilitate storing different types of capabilities data at different levels. Thus, in one example the system may include a mandatory capabilities database 260 for storing information concerning a CSCF capability required by a user. Additionally, the system may include an optional capabilities database 270 for storing information concerning a CSCF capability desired by a user and a server name capabilities database 280 for storing information concerning the name of a CSCF preferred by a user to provide a set of capabilities. When these additional databases are available, SCDB 250 may include server capabilities records having mandatory capabilities COS identifiers for linking server capabilities records to mandatory capabilities records in mandatory capabilities database 260, optional capabilities COS identifiers for linking server capabilities records to optional capabilities records in optional capabilities database 270, and server name capabilities COS identifiers for linking server capabilities records to server name capabilities records in server name capabilities database 280.

In one example, SCDB 250 and user database 240 may be operably connected to a CSCF logic 210 by an HSS logic 220. HSS logic 220 may retrieve a user record from user database 240 and then retrieve a server capabilities record from SCDB 250 using a server capability COS identifier provided in the user record and provide that information to CSCF logic 210. With the user record and the capabilities information available, CSCF logic 210 may then be selectively provisioned based, at least in part, on the server capabilities record.

Like other information, capabilities information may also be dynamic. Thus, in one example, HSS logic 220 may be configured to update CSCF logic 210 upon determining that server capabilities information has changed since the server capabilities record was retrieved. In one example this may be accomplished using a Push Profile Request (PPR) message defined in a Cx protocol.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional, not illustrated blocks. While the figures illustrate various actions occurring in serial, it is to be appreciated that various actions could occur concurrently, substantially in parallel, and/or at substantially different points in time.

Figure 3:
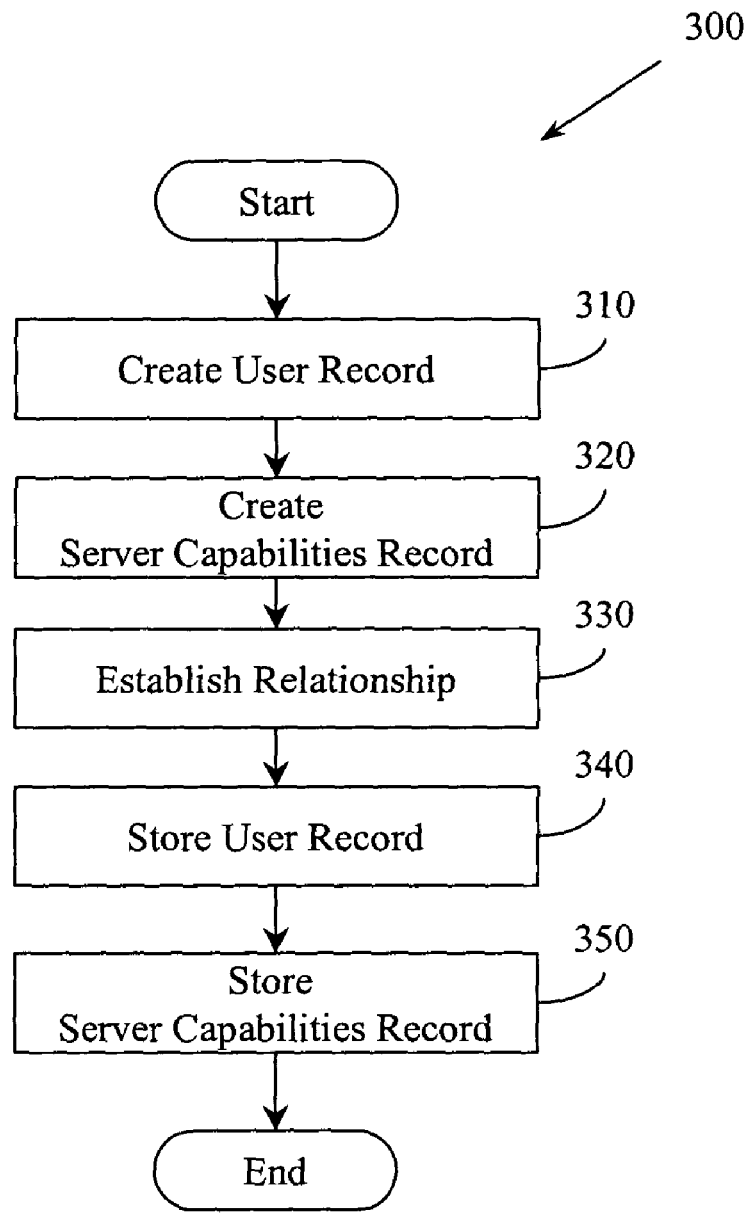
FIG. 3 illustrates an example method for configuring a portion of an IMS.

FIG. 3 illustrates an example method 300 for configuring a portion of an IMS. The illustrated elements denote "processing blocks" that may be implemented in logic. The described methods may be implemented as processor executable instructions and/or operations provided by a computer-readable medium.

Method 300 facilitates configuring a portion of an IMS. Method 300 may include, at 310, creating a user record. In one example the user record may be laid out according to the schema illustrated in FIG. 10. Method 300 may also include, at 320, creating a capabilities record. In one example, the capabilities record may also be laid out according to the schema illustrated in FIG. 10.

Method 300 may also include, at 330, establishing a relationship between the user record and the capabilities record using a capabilities COS identifier. The relationship may be established, for example, using the Server Capability Set identifier found in both the user file and the capabilities file.

Method 300 may also include, at 340, storing the user record. The record may be stored, for example, in a user database (e.g., 110 FIG. 1, 240 FIG. 2). Similarly, method 300 may include, at 350, storing the capabilities record. The capabilities record may be stored, for example, in a capabilities database (e.g., 250, FIG. 2).

With the records created, linked, and stored. Method 300 may also include, (not illustrated) provisioning a CSCF with user and capability information. The provisioning may include, for example, providing a user record and a capability record to the CSCF logic. The two records may be related and the capability record may be selected using the capability COS identifier in the user record.

While FIG. 3 illustrates various actions occurring in serial, it is to be appreciated that various actions illustrated in FIG. 3 could occur substantially in parallel. By way of illustration, a first process could create and store mandatory capability records, a second process could create and store optional capability records, a third process could create and store CSCF server name records, a fourth process could create and store CSCF capability records, and a fifth process could create relationships between the records. While five processes are described, it is to be appreciated that a greater and/or lesser number of processes could be employed and that lightweight processes, regular processes, threads, and other approaches could be employed.

Figure 4:
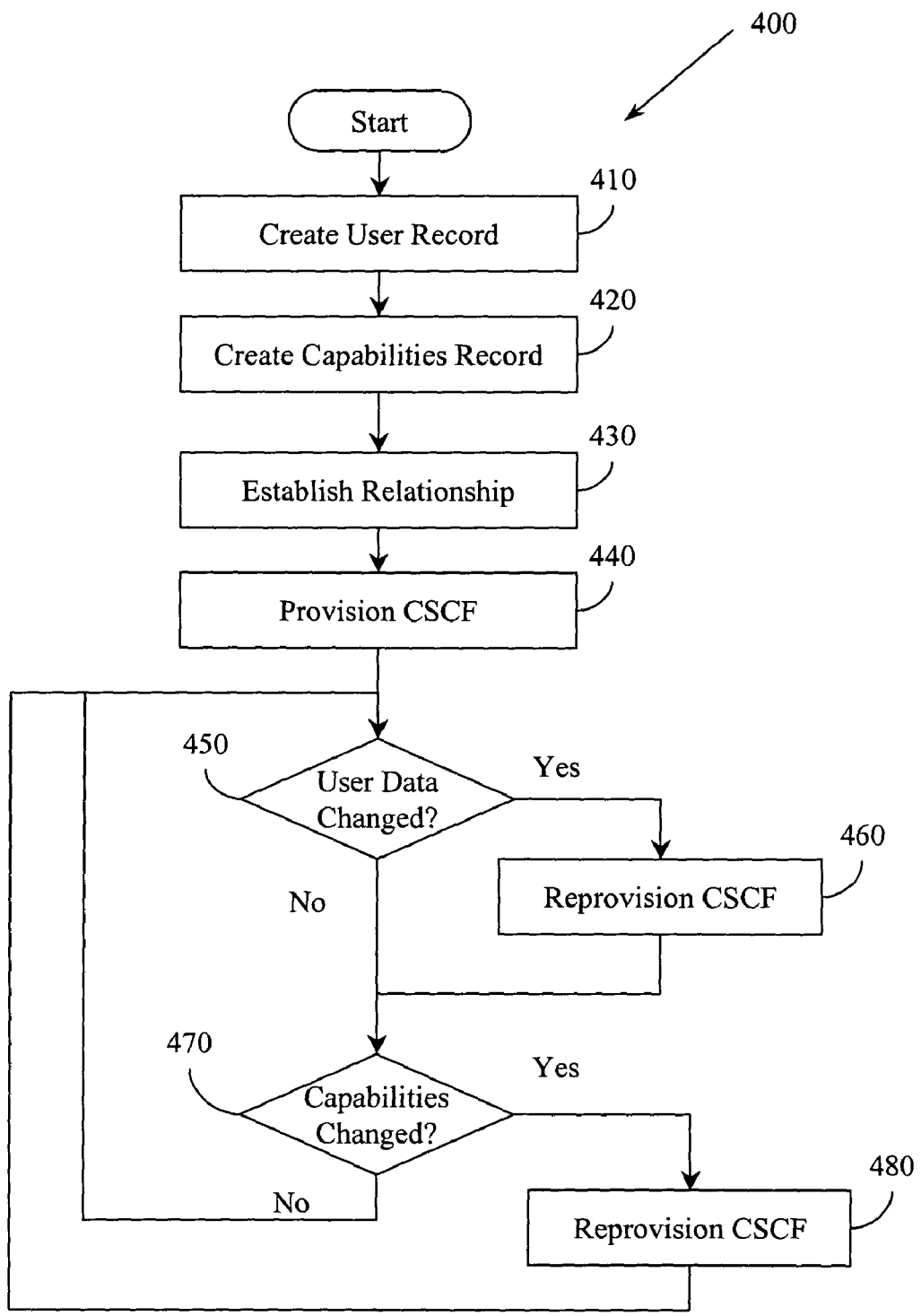
FIG. 4 illustrates an example method related to provisioning a portion of an IMS.

FIG. 4 illustrates an example method 400 associated with provisioning a portion of an IMS. Method 400 may include, at 410, creating a user record and at 420, creating a capabilities record. The user record and the capabilities record may be laid out according to the schema illustrated in FIG. 10. While a single capabilities record is described, in one example the capabilities record may include links to other capabilities records in various databases (e.g., mandatory, optional). Thus, in one example, creating the capabilities record may also include (not illustrated), creating a mandatory capabilities record, creating an optional capabilities record, and creating a server name record.

Method 400 may also include, at 430, establishing a relationship between the records using, for example, a COS identifier in both records. When the additional records (e.g., mandatory, optional) are also created, establishing a relationship may also include (not illustrated) establishing relationships between a server capabilities record and the mandatory capabilities record using a mandatory capabilities COS identifier in the server capabilities record, establishing a relationship between the server capabilities record and the optional capabilities record using an optional capabilities COS identifier in the server capabilities record, and establishing a relationship between the server capabilities record and the server name record using a server name COS identifier in the server capabilities record.

With the records created and linked, method 400 may proceed, at 440, to provision a CSCF with user and capability data. Therefore, method 400 may also include, at 450, determining whether user data has changed. If it has, method 400 may proceed, at 460, to reprovision the CSCF with respect to the user data. The reprovisioning may include, for example, exchanging a PPR/PPA message pair. Similarly, method 400 may include, at 470, determining whether capability data has changed. If so, method 400 may include, at 480, reprovisioning the CSCF with respect to capability data. Once again, the reprovisioning may include exchanging a PPR/PPA pair.

In one example, methods are implemented as processor executable instructions and/or operations stored on a computer-readable medium. Thus, in one example, a computer-readable medium may store processor executable instructions operable to perform a method that includes creating a user record, creating a server capabilities record, and establishing a relationship between the user record and the server capabilities record using a server capabilities COS identifier. With the records created and linked, the method may then include storing the user record and storing the server capabilities record. While the above method is described being stored on a computer-readable medium, it is to be appreciated that other example methods described herein can also be stored on a computer-readable medium.

Figure 5:
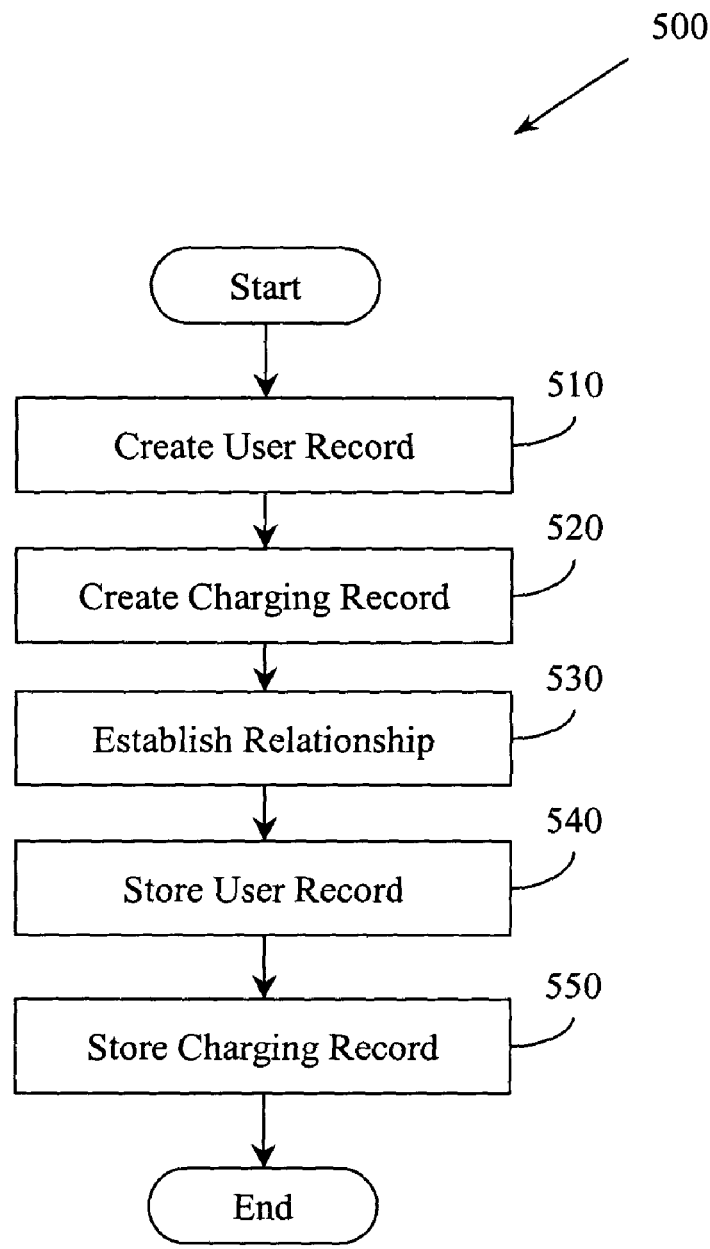
FIG. 5 illustrates an example method for configuring a portion of an IMS.

FIG. 5 illustrates an example method 500 associated with provisioning a portion(s) of an IMS. Method 500 may include, at 510, creating a user record and, at 520, creating a charging record. In one example the user record and charging record may be laid out according to the schema illustrated in FIG. 9.

Method 500 may also include, at 530, establishing a relationship between the user record and the charging record. The relationship may be established using, for example, a charging COS identifier (e.g., Charging-Info Set) found in both records. With the records created and linked, method 500 may then proceed, at 540, to store the user record and at 550, to store the charging record.

Creating and linking the records facilitates provisioning a CSCF. Thus, method 500 may also include, (not illustrated), providing a user record to a CSCF logic and then providing a related charging record to the CSCF logic. The charging record can be selected based, at least in part, on a charging COS identifier in the user record.

Figure 6:
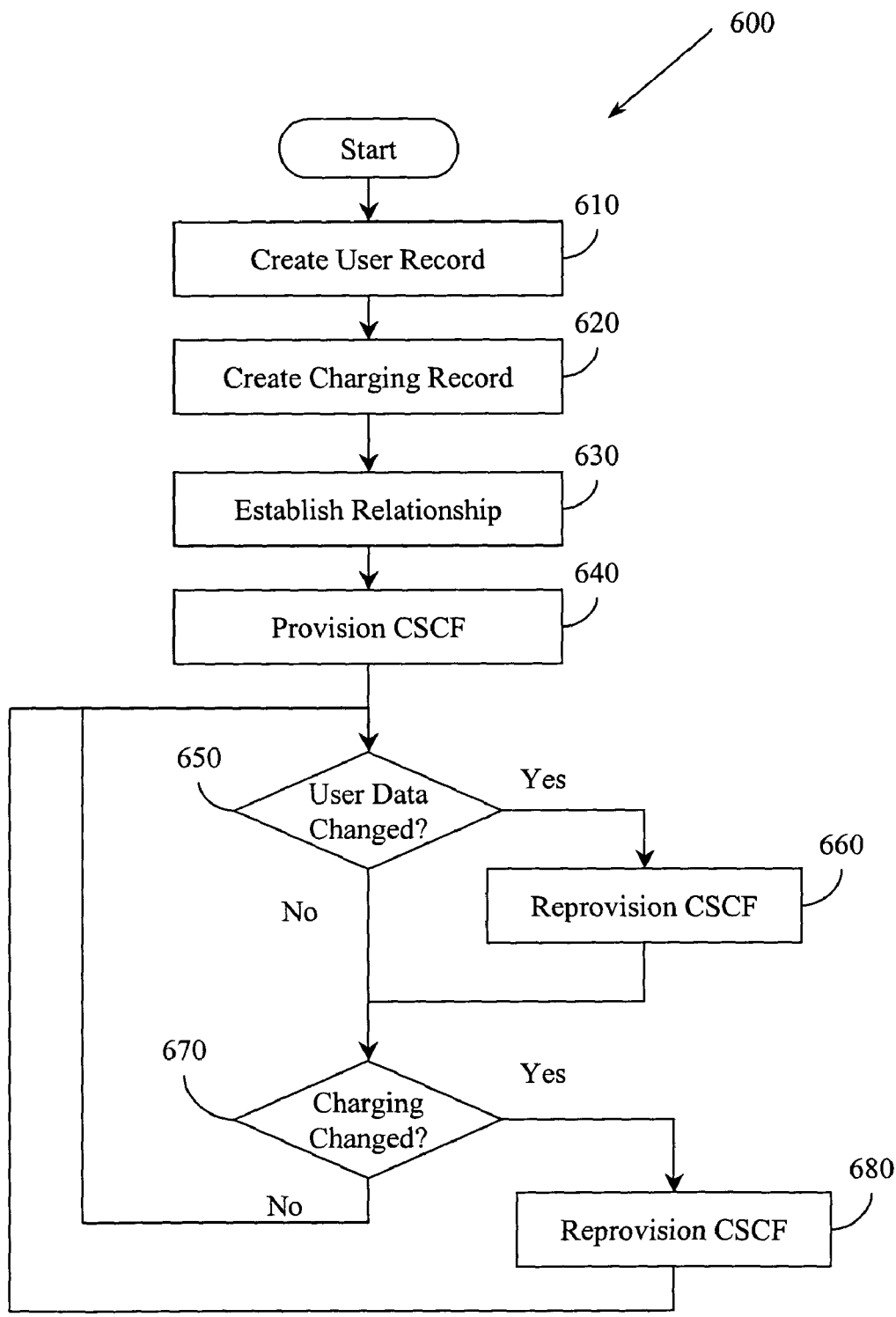
FIG. 6 illustrates an example method related to provisioning a portion of an IMS.

FIG. 6 illustrates an example method 600 associated with provisioning a portion of an IMS. Like method 500, method 600 may include creating a user record at 610, creating a charging record at 620, establishing a relationship between the records at 630, and provisioning a CSCF with the records at 640. Provisioning the CSCF may include exchanging SAR/SAA pairs and/or UAR/UAA pairs. (See, FIG. 8).

However, the data associated with the records may be dynamic. Therefore a CSCF may get out of date. Thus, method 600 may also include, at 650, determining whether user data has changed since being provided to the CSCF. If it has, then method 600 may include, at 660, providing an updated user record to the CSCF. Similarly, method 600 may include, at 670, determining whether charging data has changed since being provided to the CSCF. If it has, then method 600 may include, at 680, providing an updated charging record to the CSCF. Reprovisioning the CSCF may involve exchanging a PPR/PPA pair.

Figure 7:
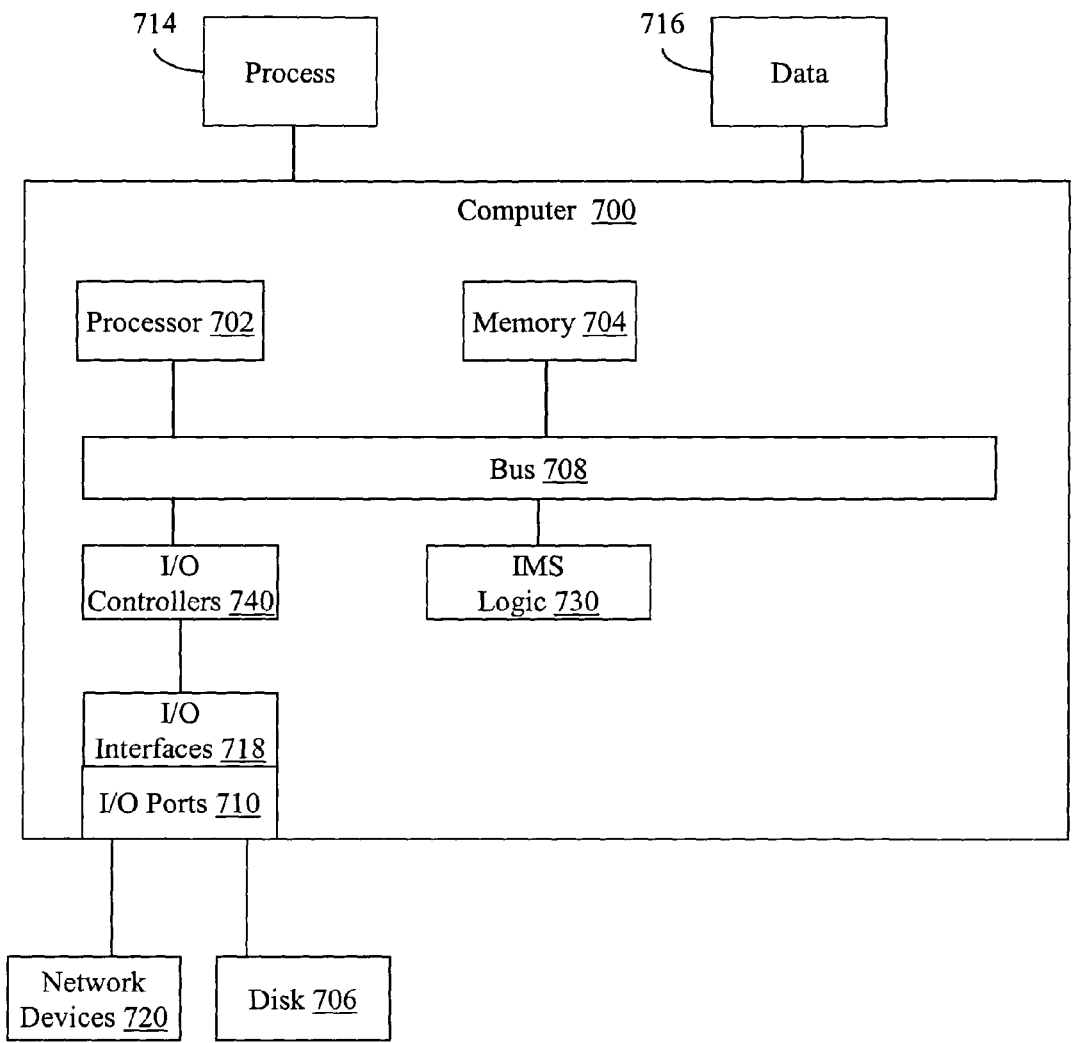
FIG. 7 illustrates an example computing environment in which example systems and methods illustrated herein can operate.

FIG. 7 illustrates an example computing device in which example systems and methods described herein, and equivalents, can operate. The example computing device may be a computer 700 that includes a processor 702, a memory 704, and input/output ports 710 operably connected by a bus 708. In one example, computer 700 may include an IMS logic 730 configured to facilitate provisioning a portion of an IMS. IMS logic 730 may provide means (e.g., hardware, software, firmware) for provisioning an IMS charging database with charging data. IMS logic 730 may also provide means (e.g., hardware, software, firmware) for provisioning an IMS user database with user data and means (e.g., hardware, software, firmware) for provisioning an IMS server capabilities database with server capability information. IMS logic 730 may also provide means (e.g., hardware, software, firmware) for provisioning a CSCF with a first data that relates a user to charging data based, at least in part, on a charging COS identifier and means (e.g., hardware, software, firmware) for provisioning the CSCF with a second data that relates the user to server capabilities data based, at least in part, on a capabilities COS identifier. While IMS logic 730 is illustrated as a logic operably connected to bus 708, it is to be appreciated that in one example IMS logic 730 may be implemented as software stored on disk 706, brought into memory 704 as a process 714, and executed by processor 702.

Generally describing an example configuration of the computer 700, the processor 702 can be a variety of various processors including dual microprocessor and other multiprocessor architectures. The memory 704 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 706 may be operably connected to the computer 700 via, for example, an input/output interface (e.g., card, device) 718 and an input/output port 710. The disk 706 can include, but is not limited to, devices including a magnetic disk drive, a solid state disk drive, a floppy disk drive, a tape drive, a Zip drive, a flash memory card, and/or a memory stick. Furthermore, the disk 706 can include optical drives including a CD-ROM, a CD recordable drive (CD-R drive), a CD rewriteable drive (CD-RW drive), and/or a digital video ROM drive (DVD ROM). The memory 704 can store processes 714 and/or data 716, for example. The disk 706 and/or memory 704 can store an operating system that controls and allocates resources of the computer 700.

The bus 708 can be a single internal bus interconnect architecture and/or other bus or mesh architectures. While a single bus is illustrated, it is to be appreciated that computer 700 may communicate with various devices, logics, and peripherals using other busses that are not illustrated (e.g., PCIE, SATA, Infiniband, 1394, USB, Ethernet). The bus 708 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 700 may interact with input/output devices via i/o interfaces 718 and input/output ports 710. Input/output devices can include, but are not limited to, a keyboard, a microphone, a pointing and selection device, cameras, video cards, displays, disk 706, network devices 720, and the like.

The input/output ports 710 can include but are not limited to, serial ports, parallel ports, and USB ports.

The computer 700 can operate in a network environment and thus may be connected to network devices 720 via the i/o devices 718, and/or the i/o ports 710. Through the network devices 720, the computer 700 may interact with a network. Through the network, the computer 700 may be logically connected to remote computers. The networks with which the computer 700 may interact include, but are not limited to, a local area network (LAN), a wide area network (WAN), and other networks. The network devices 720 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 720 can connect to WAN technologies including, but not limited to, point to point links, circuit switching networks like integrated services digital networks (ISDN), packet switching networks, and digital subscriber lines (DSL).

Figure 8:
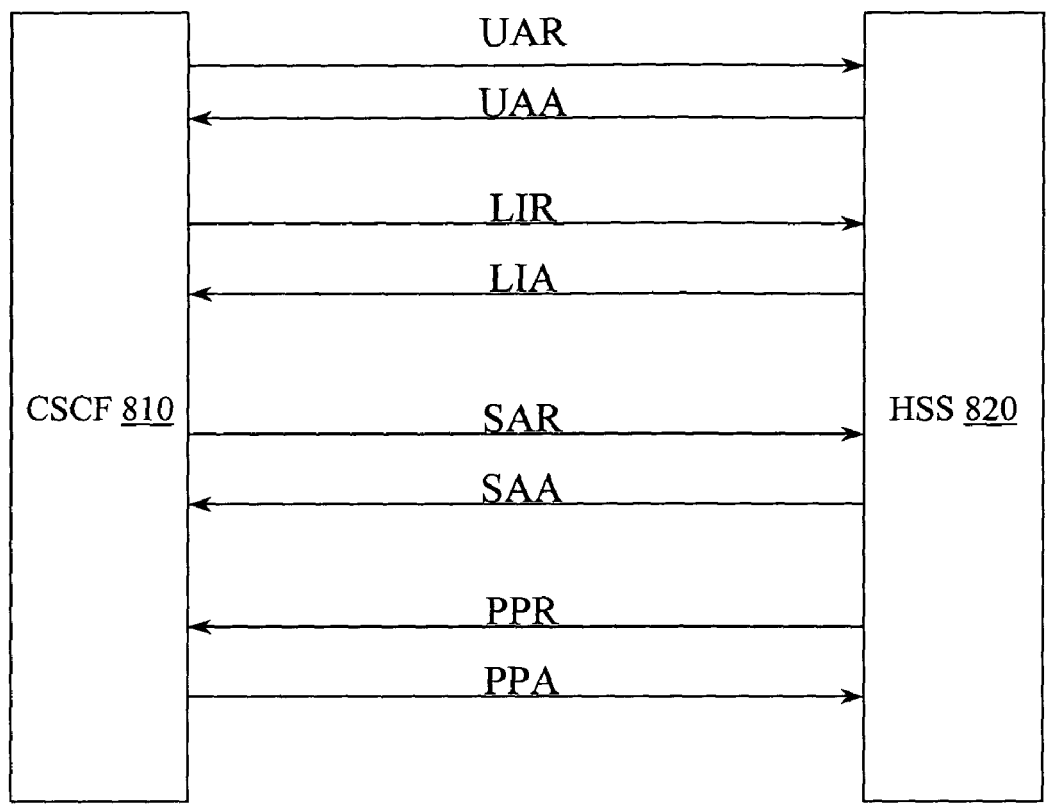
FIG. 8 illustrates an example set of messages passed between an HSS and a CSCF.

FIG. 8 illustrates an example set of messages passed between an HSS 820 and a CSCF 810. The messages may be defined as part of a Cx protocol, for example. The messages may be part of a Cx protocol that groups operations functionally. For example, location management procedures including (de)registration, location retrieval, and so on may form one group while user data handling procedures including downloading user information during registration, downloading user information after updates, and so on, may form another group. These messages facilitate moving data from more permanent storage associated with an HSS to less permanent storage associated with a CSCF. The HSS may store data on a user subscription timeframe while a CSCF may store data on a user session timeframe. Thus, data may be moved from the HSS to the CSCF on a per session basis, for example. Since data may change, even while a session is in progress, the protocol also facilitates updating a CSCF should data change. The COS identifiers employed by the example systems and methods described herein facilitate mitigating maintenance issues associated with such changes.

The messages may include a user authorization request (UAR) and a user authorization answer (UAA). A UAR is sent from a client (e.g., I-CSCF) to a server (e.g., HSS) to request authorization of the registration of a multimedia user. The UAR may include a session identifier and a public user identity. The UAA is returned from the server to the client in response to the UAR. If the authorization is allowed, the UAA may include a session identifier, the name of a CSCF selected to serve the user, and capabilities associated with the user and CSCF. The UAR/UAA exchange may occur, for example, when an I-CSCF tries to obtain capabilities information an S-CSCF will have to support, when an I-CSCF tries to obtain S-CSCF information for a registered user, and so on.

The messages may also include a location information request (LIR) and a location information answer (LIA). The LIR is sent from a client (e.g., I-CSCF) to a server (e.g., HSS) requesting the name of the server (e.g., S-CSCF) currently assigned to serve the user. The LIR may include a session identifier and a public user identity. The LIA is returned from the server to the client in response to the LIR. The LIA may include a session identifier, a server (S-CSCF) name, and capabilities associated with that server (S-CSCF).

The messages may also include a server assignment request (SAR) and a server assignment answer (SAA). The SAR may be sent from a client (e.g., S-CSCF) to a server (e.g., HSS) requesting data about the server assigned to serve the user. The SAR may include a session identifier, a public user identity, and a server name. The SAA is returned from the server to the client in response to the SAR. The SAA may include a session identifier, a user name, user data, charging data, and so on. The SAR/SAA exchange may occur, for example, when an S-CSCF is assigned to a public identify, to download from an HSS relevant information that an S-CSCF needs to server a user, and so on.

The messages may also include a push profile request (PPR) and a push profile answer (PPA). The PPR is sent from a server (e.g., HSS) to a client (e.g., S-CSCF) to update data for a user. For example, if user data changes, capabilities data changes, charging data changes, and so on, a PPR may be sent from an HSS to an S-CSCF. The PPR may include a session identifier, a user name, user data, charging data, and so on. The PPA is returned in response to the PPR. A PPR/PPA exchange may occur, for example, when an S-CSCF is assigned to a user, when user data changes, and so on.

Figure 9:
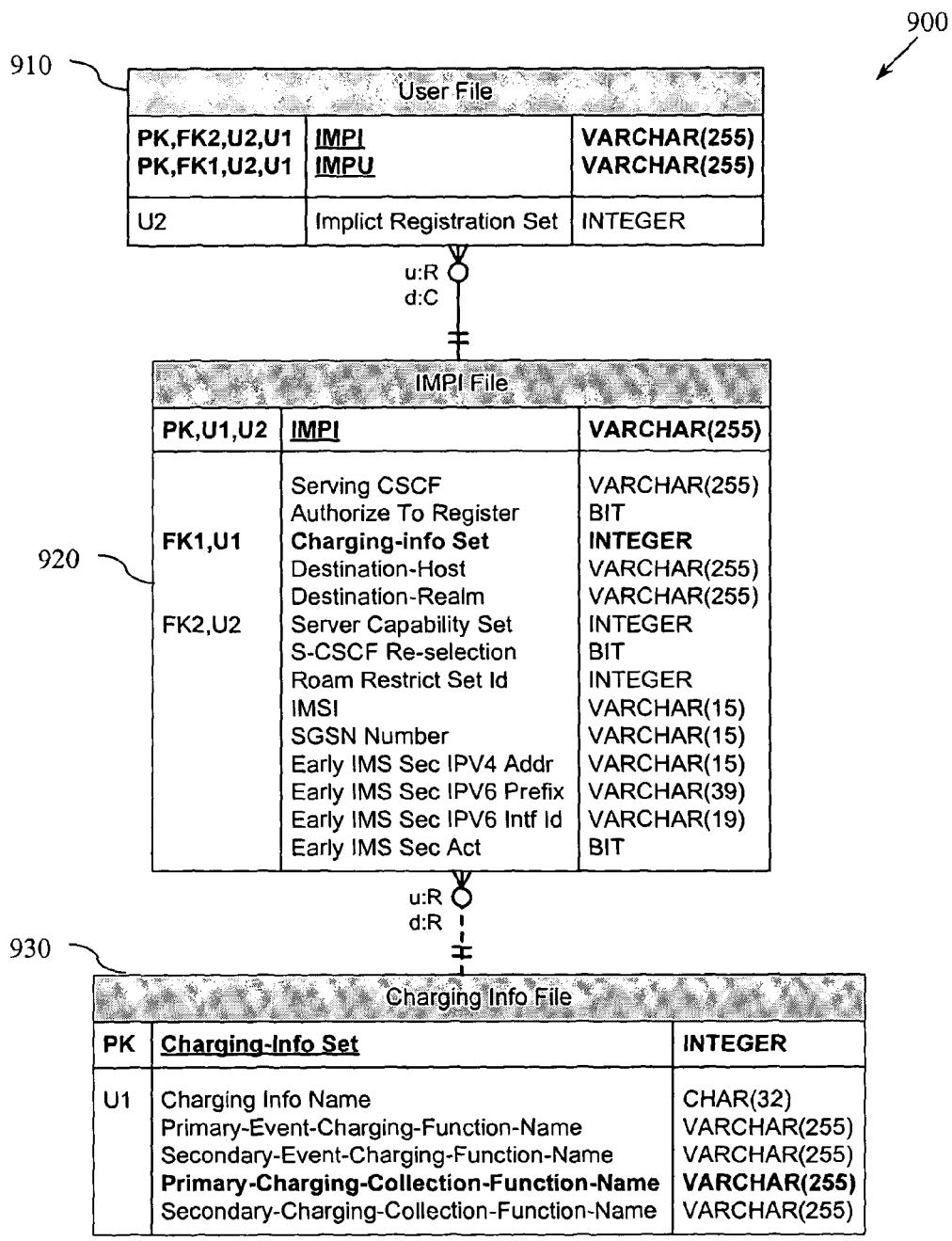
FIG. 9 illustrates an example schema.

FIG. 9 illustrates an example schema 900 that describes various data stores employed in connection with the example systems and methods described herein. It is to be appreciated that schema 900 is but one example and that different tables, different table arrangements, different dependencies, and so on may be employed.

Schema 900 includes a user data store 910 that includes both a private user identifier and a public user identifier. In the example, the private user identifier is used to link the user data store 910 to another user data store 920 (IMPI). The IMPI data store 920 includes more information about a user, including a link to a charging data store 930. The link (e.g., Charging-Info Set field) can be provisioned with a COS identifier that can in turn be used as a primary key to index into the charging data store 930. Note that in data store 920 no specific charging information has been linked to a user. However, abstract information about charging has been linked using the Charging Info Set identifier in the IMPI data store 920.

The example charging information stored in charging data store 930 includes a Charging-Info Set identifier. This is a primary key that facilitates linking records in the IMPI data store 920 to records in the charging data store 930. The example charging information may include a Primary-Event-Charging-Function-Name. This field may provide an address (e.g., Uniform Resource Locator (URL)) of a function that can be called to charge a user for performing various actions and/or using services provided by an IMS. Similarly, the example charging information may include a Secondary-Event-Charging-Function-Name. This field may also provide an address (e.g., URL) of a function that can be called to charge a user for performing various actions and/or using services provided by an IMS. In addition to addresses for charging functions, charging data store 930 may also store addresses for collection functions. It is to be appreciated that data store 930 illustrates but one example of charging information that may be decoupled from a user record and still be retrievable via a CSCF using a COS identifier provided in a user record.

Thus, schema 900 illustrates a configuration where a user has a public and a private identifier. The private identifier can be used to locate more information about the user including charging information. Note that charging specific information is segregated in charging data store 930. Thus, changes to charging data can be confined to charging data store 930, which removes a conventional need to update charging data in other data stores (e.g., 920) when charging data changes. This isolation is achieved by including a charging information set number in the charging information set field in the IMPI data store 920.

Figure 10:
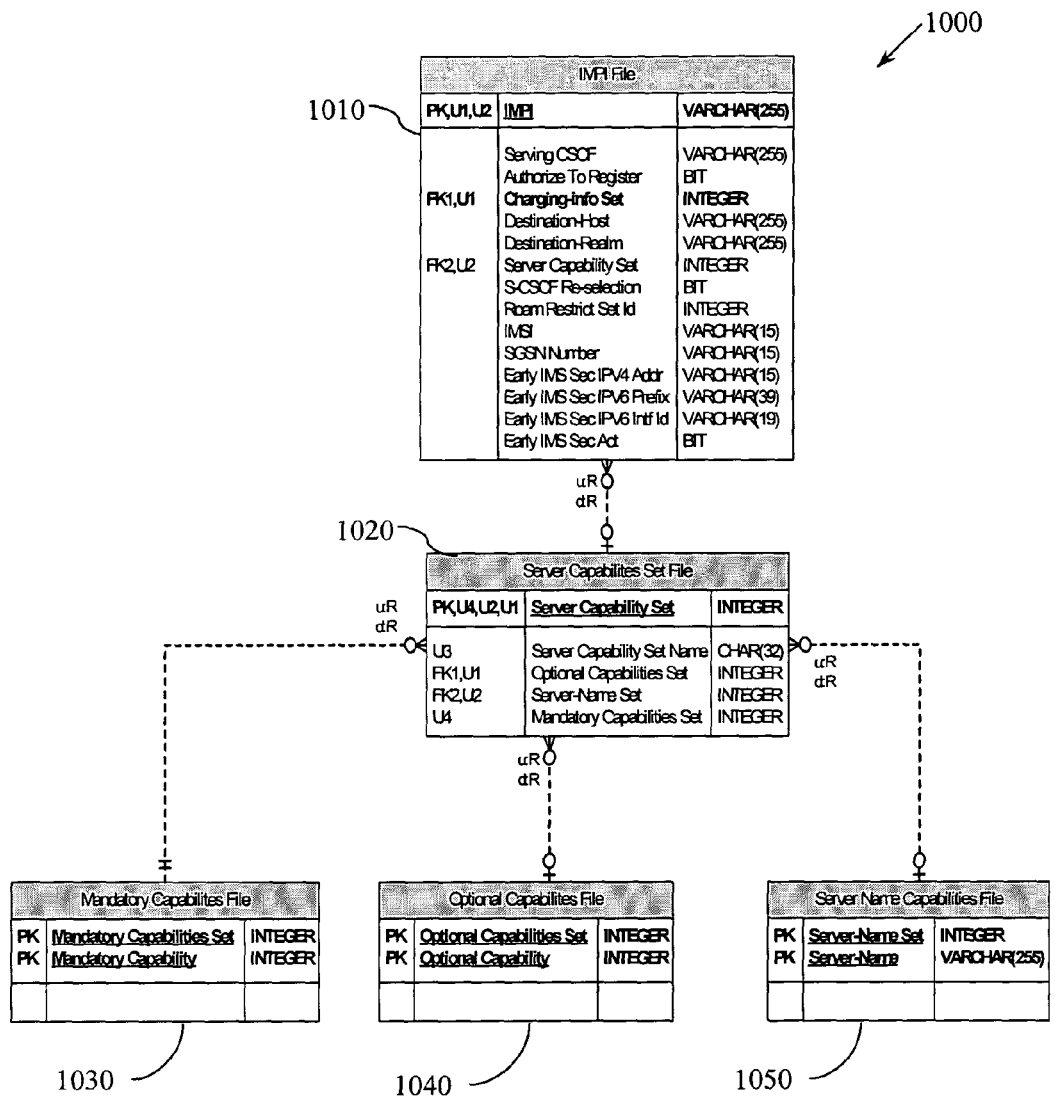
FIG. 10 illustrates another example schema.

FIG. 10 illustrates an example schema 1000 that describes various data stores employed in connection with the example systems and methods described herein. It is to be appreciated that schema 1000 illustrates but one example and that different tables, different table arrangements, different dependencies, and so on may be employed.

Schema 1000 includes an IMPI data store 1010. The IMPI data store 1010 can be reached from a user data store (see, e.g., user data store 910, FIG. 9). IMPI data store 1010 may include information about a user, including a link to a charging data store 930 (FIG. 9). Additionally, IMPI data store 1010 may include information including a link to a server capabilities data store 1020. For example, a Server Capabilities Set field can be provisioned with a capabilities COS identifier that can in turn be used as a primary key to index into the server capabilities data store 1020. Note that at this point no specific capabilities information has been linked to a user. However, abstract information concerning required and/or desired CSCF capabilities has been linked using the Server Capability Set identifier in the IMPI data store 1020.

The server capabilities data store 1020 may in turn store COS identifiers that facilitate linking records in the server capabilities data store 1020 to a mandatory capabilities data store 1030, an optional capabilities data store 1040, and/or a server name capabilities data store 1050. Thus, a single record in the server capabilities data store 1020 that may be indexed using the capabilities COS identifier can facilitate reaching three different types of capabilities information. This capabilities information may describe, for example, a type and/or level of functionality that can be provided by a CSCF and/or that is desired and/or required by a user equipment and/or application. Additionally, the capabilities information may identify the name of a set of CSCF server capabilities.

An I-CSCF may select an S-CSCF for a user session based on matches between capabilities an S-CSCF can provide and what a user needs and/or wants. Thus, values from records in data stores 1020, 1030, 1040, and/or 1050 may be passed between an I-CSCF and an HSS during user registration. After selection, values may pass between the HSS and the selected S-CSCF. Since these values may change, they may also be updated and passed between the HSS and the selected S-CSCF upon detecting a change. The values may be passed between an I-CSCF and the HSS using, for example, a UAR/UAA message pair as described in the Cx protocol. Values may be passed between the selected S-CSCF and the HSS using, for example, an SAR/SAA pair. Additionally, the updated values may be passed between the HSS and the S-CSCF using, for example, a PPR/PPA message pair.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. The application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
   a charging database (CDB) to store charging information concerning an internet protocol (IP) multimedia core network subsystem (IMS) user, the charging information being stored in a charging record in the CDB, the charging record including a charging class of service (COS) identifier, the CDB employing the charging COS identifier as a primary key; and
   a user database to store user information concerning an IMS user, the user information being stored in a user record in the user database, the user record including a charging COS entry, wherein the charging COS entry includes the charging COS identifier;
   the CDB and the user database being operably connectable via a Home Subscriber Server (HSS) hardware logic to a call session control function (CSCF) hardware logic, wherein the FESS hardware logic to:
   retrieve the user record from the user database;
   retrieve charging information concerning the user from the CDB using the charging COS identifier provided in the user record to select the charging record associated with the charging COS identifier from the charging database; and
   configure the CSCF hardware logic for charging the user based, at least in part, on the charging information retrieved from the CDB.

2. The system of claim 1, wherein the HSS hardware logic is to update the CSCF hardware logic upon determining that charging information concerning the user has changed in the CDB.

3. The system of claim 1, wherein the HSS hardware is to update the CSCF hardware logic using a Push Profile Request (PPR) message defined in a Cx protocol.

4. The system of claim 1, wherein the charging record further comprises:
   a primary event charging function address; and
   a primary charging collection function address.

5. The system of claim 4, wherein the charging record further includes:
   a secondary event charging function address; and
   a secondary charging collection function address.

6. The system of claim 1, wherein the user record further comprises:
   a user identifier.

7. The system of claim 1, the CDB and the user database being organized in an HSS database, wherein the CSCF hardware logic is to communicate with the HSS database using a Cx protocol.

8. A method for configuring an Internet Protocol (IP) Multimedia Core Network Subsystem (IMS), comprising:
   creating a user record, the user record including a charging class of service (COS) entry, wherein the charging COS entry includes a charging COS identifier;
   creating a charging record, the charging record including the charging COS identifier;
   establishing, using a home Subscriber Server (HSS) hardware logic, a relationship between the user record and the charging record using the COS identifier;
   storing the user record, including the charging COS identifier, in a user database;
   storing the charging record, including the charging COS identifier, in a charging database (CDB);
   retrieving the user record from the user database;
   retrieving charging information concerning the user from the CDB using the charging COS identifier provided in the user record to select the charging record associated with the charging COS identifier from the CDB;
   providing the user record to a call session control function (CSCF) logic, the CSCF configured to charge the user; and
   providing the charging record to the CSCF logic, the charging record being related to the user, the charging record being selected based, at least in part, on the charging COS identifier in the user record.

9. The method of claim 8, including providing an updated user record to the CSCF upon determining that the user record in the user database has changed since being provided to the CSCF logic.

10. The method of claim 9, including providing an updated charging record to the CSCF logic upon determining that a charging record in the charging database has changed since being provided to the CSCF logic.

11. A non-transitory computer-readable storage medium, the storage medium storing processor executable instructions which when executed by a processor are to perform a method for configuring an Internet Protocol (IP) Multimedia Core Network Subsystem (IMS), the method comprising:
   creating a user record, the user record including a charging class of service (COS) entry, wherein the charging COS entry includes a charging COS identifier;
   creating a charging record, the charging record including the charging COS identifier;
   establishing a relationship between the user record and the charging record using the COS identifier;
   storing the user record, including the charging COS identifier;
   storing the charging record, including the charging COS identifier;
   retrieving charging information concerning the user from the stored charging record using the charging COS identifier provided in the user record to select the charging record associated with the charging COS identifier in the stored charging record;
   providing the user record to a call session control function (CSCF) logic; and
   providing the charging record to the CSCF, the charging record being related to the user, the charging record being selected based, at least in part, on the charging COS identifier in the user record.

12. A system, comprising:
means for provisioning an internet protocol (IP) multimedia core network sub-system (IMS) charging database (CDB) with charging data associated with a charging class of service (COS) identifier;
means for provisioning an IMS user database with user data associated with the charging COS identifier;
the CDB and the user database being operably connectable via a Home Subscriber Server (HSS) hardware logic to a call session control function (CSCF) hardware logic, wherein the HSS hardware logic comprises:
means for retrieving a user record from the user database;
means for retrieving charging information concerning a user from the CDB using the COS identifier provided in the user data to select the charging data associated with the charging COS identifier from the CDB: and
means for provisioning the CSCF with the user data, the charging data, and data that relates a user to charging data based, at least in part, on the charging COS identifier.

13. The system of claim 12, including:
means for selectively updating the CSCF upon determining that one or more of, the user data has changed since provisioning the CSCF, and the charging data has changed since provisioning the CSCF.

14. A system, comprising:
a server capabilities database (SCDB) to store server capabilities information (SCI) relating a user and a serving call session control function (S-CSCF), the SCI being stored in a server capabilities record in the SCDB, the server capabilities record including a server capabilities class of service (COS) identifier, the SCDB employing the server capabilities COS identifier as a primary key; and
a user database to store user information concerning an internet protocol (IP) multimedia core network subsystem (IMS) user, the user information being stored in a user record in the user database, the user record including a server capability COS entry, wherein the server capability COS entry includes the server capabilities COS identifier;
the SCDB and the user database being operably connectable, via a Home Subscriber Server (HSS) hardware logic, to a call session control function (CSCF) hardware logic, wherein the HSS logic is to:
retrieve the user record concerning the user from the user database;
retrieve the server capabilities record from the SCDB using the server capabilities COS identifier provided in the user record; and
selectively provision the S-CSCF based, at least in part, on the server capabilities record.

15. The system of claim 14, wherein the MSS hardware logic is to update the CSCF hardware logic upon determining that server capabilities information has changed since the server capabilities record was retrieved.

16. The system of claim 15, wherein the HSS hardware logic is to update the CSCF logic using a Push Profile Request (PPR) message defined in a Cx protocol.

17. The system of claim 16, including a mandatory capabilities database to store information concerning a CSCF capability required by a user.

18. The system of claim 17, including a capabilities database to store information concerning a CSCF capability desired by a user.

19. The system of claim 18, including a server name capabilities database to store information concerning the name of a CSCF preferred by a user to provide a set of capabilities.

20. The system of claim 19, the SCDB including one or more server capabilities records, a server capabilities record comprising:
a mandatory capabilities COS identifier to link a server capabilities record to a mandatory capabilities record in a mandatory capabilities database;
a capabilities COS identifier to link a server capabilities record to a capabilities record in a capabilities database; and
a server name capabilities COS identifier to link a server capabilities record to a server name capabilities record in a server name capabilities database.

21. The system of claim 20, wherein the user database further comprises:
a user identifier.

22. The system of claim 14, the SCDB and the user database being organized in an HSS database, wherein the CSCF hardware logic is to communicate with the HSS database using a Cx protocol.

23. A method for configuring an Internet Protocol (IP) Multimedia Core Network Subsystem (IMS), comprising:
creating a user record, the user record including a server capability class of service (COS) entry, wherein the server capability COS entry includes a server capabilities COS identifier;
creating a server capabilities record, the server capabilities record including the server capabilities COS identifier, wherein the server capabilities COS identifier is a primary key;
establishing, using a Home Subscriber Server (HSS) hardware logic, a relationship between the user record and the server capabilities record using a server capabilities class of service (COS) identifier;
storing the user record, including the server capabilities COS identifier, in a user database;
storing the server capabilities record, including the server capabilities COS identifier, in a server capabilities database (SCDB); and
retrieving the server capabilities record from the SCDB using the server capabilities COS identifier provided in the user record.

24. The method of claim 23, including:
creating a mandatory capabilities record;
establishing a relationship between a server capabilities record and the mandatory capabilities record using a mandatory capabilities COS identifier in the server capabilities record;
creating an optional capabilities record;
establishing a relationship between the server capabilities record and the optional capabilities record using an optional capabilities COS identifier in the server capabilities record;
creating a server name record;
establishing a relationship between the server capabilities record and the server name record using a server name COS identifier in the server capabilities record;
storing the mandatory capabilities record;
storing the optional capabilities record; and
storing the server name record.

25. The method of claim 24, including:
providing a user record to a call session control function (CSCF) logic; and providing a server capabilities record to the CSCF, the server capabilities information record being related to the user record by a COS identifier.

26. The method of claim 25, including providing an updated user record to the CSCF upon determining, that a user record has changed since being provided to the CSCF.

27. The method of claim 26, including providing an updated server capabilities record to the CSCF upon determining that a server capabilities record has changed since being provided to the CSCF.

28. A non-transitory computer-readable storage medium, the storage medium storing processor executable instructions which when executed by a processor are operable to perform a method for configuring an Internet Protocol (IP) Multimedia Core Network Subsystem (IMS), the method comprising:
creating a user record;
creating a server capabilities record;
establishing a relationship between the user record and the server capabilities record using a server capabilities class of service (COS) identifier;
storing the user record;
storing the server capabilities record, including the server capabilities COS identifier;
creating a mandatory capabilities record, including the server capabilities COS identifier;
establishing a relationship between the server capabilities record and the mandatory capabilities record using a mandatory capabilities COS identifier in the server capabilities record;
creating an optional capabilities record;
establishing a relationship between the server capabilities record and the optional capabilities record using an optional capabilities COS identifier in the server capabilities record;
creating a server name record;
establishing a relationship between the server capabilities record and the server name record using a server name COS identifier in the server capabilities record;
storing the mandatory capabilities record;
storing the optional capabilities record; and
storing the server name record.

29. A system, comprising:
means for provisioning an internet protocol (IP) multimedia core network subsystem (IMS) server capabilities database (SCDB) with server capabilities information (SCI) data associated with a server capabilities class of service (COS) identifier;
means for provisioning an IMS user database with user data associated with the server capabilities COS identifier;
the SCDB and the user database being operably connectable via a Home Subscriber Server (HSS) hardware logic to a call session control function (CSCF), wherein the HSS comprises:
means for retrieving the user record concerning the user from the user database;
means for retrieving SCI from the SCDB using the a server capabilities COS identifier provided in the IMS user database; and
means for provisioning the Call Session Control Function (CSCF) with data that relates a user to a SCI data based, at least in part, on the a server capabilities COS identifier.

30. The system of claim 29, including:
means for selectively updating the CSCF upon determining that one or more of, the user data has changed since provisioning the CSCF, and the capabilities data has changed since provisioning the CSCF.

31. A system, comprising:
means for provisioning an internet protocol (IP) multimedia core network subsystem (IMS) charging database with charging data associated with a charging class of service (COS) identifier;
means for provisioning an IMS user database with user data associated with the charging COS identifier;
means for provisioning an IMS server capabilities database with server capability information associated with a service capabilities class of service (COS) identifier;
means for provisioning the IMS user database with user data associated with the service capabilities COS identifier;
means for retrieving service capabilities information from the IMS capabilities database using the service capabilities COS identifier provided in the IMS user database;
means for retrieving charging information concerning the user from the IMS charging information using the charging COS identifier provided in the IMS charging database;
means for provisioning a Call Session Control Function (CSCF) with a first data that relates a user to charging data based, at least in part, on the charging COS identifier; and
means for provisioning the CSCF with a second data that relates the user to server capabilities data based, at least in part, on the service capabilities COS identifier.

* * * * *

UNITED STATES PATENT AND TRADEMARK OFFICE
CERTIFICATE OF CORRECTION

| | | |
|---|---|---|
| PATENT NO. | : 8,213,411 B2 | Page 1 of 1 |
| APPLICATION NO. | : 11/212246 | |
| DATED | : July 3, 2012 | |
| INVENTOR(S) | : John I. Ayers et al. | |

It is certified that error appears in the above-identified patent and that said Letters Patent is hereby corrected as shown below:

In column 4, line 45, delete "servelet" and insert -- servlet --, therefor.

In column 15, line 40, in Claim 1, delete "FESS" and insert -- HSS --, therefor.

In column 16, line 16, in Claim 8, delete "home" and insert -- Home --, therefor.

In column 17, line 18, in Claim 12, delete "CDB:" and insert -- CDB; --, therefor.

In column 17, line 55, in Claim 15, delete "MSS" and insert -- HSS --, therefor.

In column 19, line 5, in Claim 26, delete "determining," and insert -- determining --, therefor.

In column 20, line 10, in Claim 29, after "the" delete "a".

In column 20, line 14, in Claim 29, after "the" delete "a".

In column 20, lines 29-30, in Claim 30, delete "service" and insert -- server --, therefor.

In column 20, line 32, in Claim 30, delete "service" and insert -- server --, therefor.

In column 20, line 34, in Claim 30, delete "service" and insert -- server --, therefor.

In column 20, line 35, in Claim 30, delete "service" and insert -- server --, therefor.

In column 20, line 47, in Claim 30, delete "service" and insert -- server --, therefor.

Signed and Sealed this
Twenty-sixth Day of February, 2013

Teresa Stanek Rea
*Acting Director of the United States Patent and Trademark Office*